United States Patent [19] — Fleming

[11] 3,757,057

[45] Sept. 4, 1973

[54] RECORDER INDEXING APPARATUS WITH A CUMULATIVE INDICATION OF THE AMOUNT OF TAPE WITHDRAWN FROM THE SUPPLY REEL

[75] Inventor: Ronald F. Fleming, Atlanta, Ga.

[73] Assignee: Lanier Electronic Laboratory, Inc., Atlanta, Ga.

[22] Filed: Mar. 17, 1972

[21] Appl. No.: 235,541

[52] U.S. Cl .................... 179/100.2 R, 179/100.1 R, 179/100.1 DR, 179/100.2 B, 242/204

[51] Int. Cl. ........................ G11b 27/14, G11b 15/18

[58] Field of Search .............. 179/100.2 R, 100.2 B, 179/100.1 R, 100.1 DR, 100.1 PS; 242/201, 204, 57, 55.19 R; 226/45

[56] References Cited

UNITED STATES PATENTS

| | | | |
|---|---|---|---|
| 3,467,791 | 9/1969 | Bolick , Jr. | 179/100.1 R |
| 3,632,899 | 1/1972 | Ban | 179/100.2 R |
| 3,373,951 | 3/1968 | Mazoyer | 242/55.19 R |
| 3,632,896 | 1/1972 | Ban | 179/100.2 B |
| 2,779,826 | 1/1957 | Scott | 179/100.2 R |
| 2,757,456 | 8/1956 | Handa | 179/100.2 R |
| 2,756,279 | 7/1956 | Lang | 179/100.2 R |

*Primary Examiner*—Terrell W. Fears
*Assistant Examiner*—Alfred H. Eddleman
*Attorney*—Harold D. Jones, Jr., Roger T. Frost et al.

[57] ABSTRACT

Indexing apparatus for use with a tape recorder or the like, and providing a cumulative indication of the amount of tape withdrawn from a supply reel. The apparatus is coupled to the tape recorder spindle on which a tape supply reel is mounted, and includes a one-way drive arrangement which permits an indicator to be advanced only when the spindle is being moved by the initial withdrawal of tape from the supply reel. The indicator can be unchanged by movement of the spindle to rewind tape onto the supply reel, so that the indicator always provides a cumulative indication of the amount of tape initially withdrawn from the supply reel. Apparatus is provided to reset the indicator to zero or another starting point.

14 Claims, 3 Drawing Figures

RECORDER INDEXING APPARATUS WITH A CUMULATIVE INDICATION OF THE AMOUNT OF TAPE WITHDRAWN FROM THE SUPPLY REEL

This invention relates in general to indexing apparatus and in particular to indexing apparatus for use on and in combination with tape recorder apparatus.

Recording devices are well known in the art for recording electrical signals, such as audio and/or video information, on various recording media such as magnetic tape or the like. It is also known to provide various types of indicators or like devices on the recorders to account for the movement of the recording medium. The need and desirability of such indicating devices is particularly prevalent with recorders intended for use as dictation-transcription apparatus, since many different letters, memoranda, or other discrete messages typically are recorded on a particular quantity of tape. It is considered desirable to have an indexing apparatus which advises the dictator of the amount of tape used and/or the amount of unrecorded tape remaining on a particular reel, cassette, belt, or other recording medium. Such indicators are typically calibrated in terms of "minutes," that is, either the number of minutes of recording already imparted to the tape or the amount of unused recording time remaining on the tape supply.

Prior art recorder indexing devices generally are driven or otherwise controlled in some way by the operation of the tape transport mechanism, with the indicator moving in one direction as the recording tape traverses a first direction (for example, forward tape movement) and moving in the opposite direction as the tape is traversed in the other direction (for example, reverse tape movement). When a recorder using this kind of indexing apparatus is reversed following dictation or other recording of a passage occupying less than the entire available amount of tape, as for rewinding the tape to review the dictated material, the operator of the recorder has no clear indication of the maximum previous use of the recording tape since the indicator moves in a reverse direction as the tape is reversed. Before the person can know whether sufficient unrecorded tape remains for recording the next desired information, such as the next letter to be dictated, he must first advance the tape in a forward-playback direction until the desired point is reached on the tape where dictation previously ceased. Since the signal output on most dictation apparatus is muted during fast-forward movement, this tape advance may require several "false stops" for listening to determine whether the desired point on the tape has been reached. After this desired point has been finally reached, the persons may be advised from the indicator that there is insufficient unrecorded tape remaining and that his time spent in advancing the tape in the forward direction was wasted.

Prior art recorders intended for use as dictating apparatus frequently provide for a record strip of a suitable marking material such as paper or the like to be inserted in the recorder, usually in conjunction with the recorder indexing apparatus, so that this strip could be marked by perforations or other indicia corresponding with the location on the tape of discrete events such as message-end, special instructions to the transcriber, or the like. Because of this, prior art indexing apparatus used with dictation recorders have frequently embodied a paper punch, stylus, or other actuating device and associated control mechanisms, so that the indexing apparatus could perform the additional function of index strip marking. With at least one new dictation recording system, as described in pending U.S. Pat. application, Ser. No. 149,480, filed June 3, 1971 and entitled "Dictation-Transcription Method and System," the indicia corresponding to events such as message-end and the like are actually recorded on the tape itself rather than being disposed on a separate indexing strip. With the advent and increasing popularity of such dictation equipment not requiring index marking apparatus which inevitably transverses a separate indexing strip and which must be provided for the additional purpose of a visual indexing apparatus, it becomes even more important to provide a suitable recorder indexing apparatus which avoids the foregoing shortcomings of the prior art and which is especially useful as an indicator of the amount of tape withdrawn from a tape supply reel.

Accordingly, it is an object of the present invention to provide improved recorder indexing apparatus.

It is another object of the present invention to provide recorder indexing apparatus which provides an indication only of tape withdrawn from a tape supply.

It is yet another object of the present invention to provide recorder indexing apparatus which provides a cumulative indication of the amount of tape initially withdrawn from a tape supply, with such indication being unchanged by rewinding of previously recorded tape back onto the tape supply source or by unwinding of such rewound tape.

Many of the other objects and attendant advantages of the present invention will become more readily apparent from the embodiment thereof as described in the following specification, including the drawings in which.

Stated in general terms, the present invention includes a drive mechanism operatively coupled to the recorder spindle or other device upon which the tape supply reel is mounted for movement in the forward and reverse directions. A one-way drive device is coupled to the drive mechanism in such a way that the one-way drive device produces output movement in response only to movement of the tape reel caused by initial unwinding of the tape from the reel. A suitable mechanical or electrical indicator is provided to be operated in response to the output of the one-way drive device.

Figure 1:
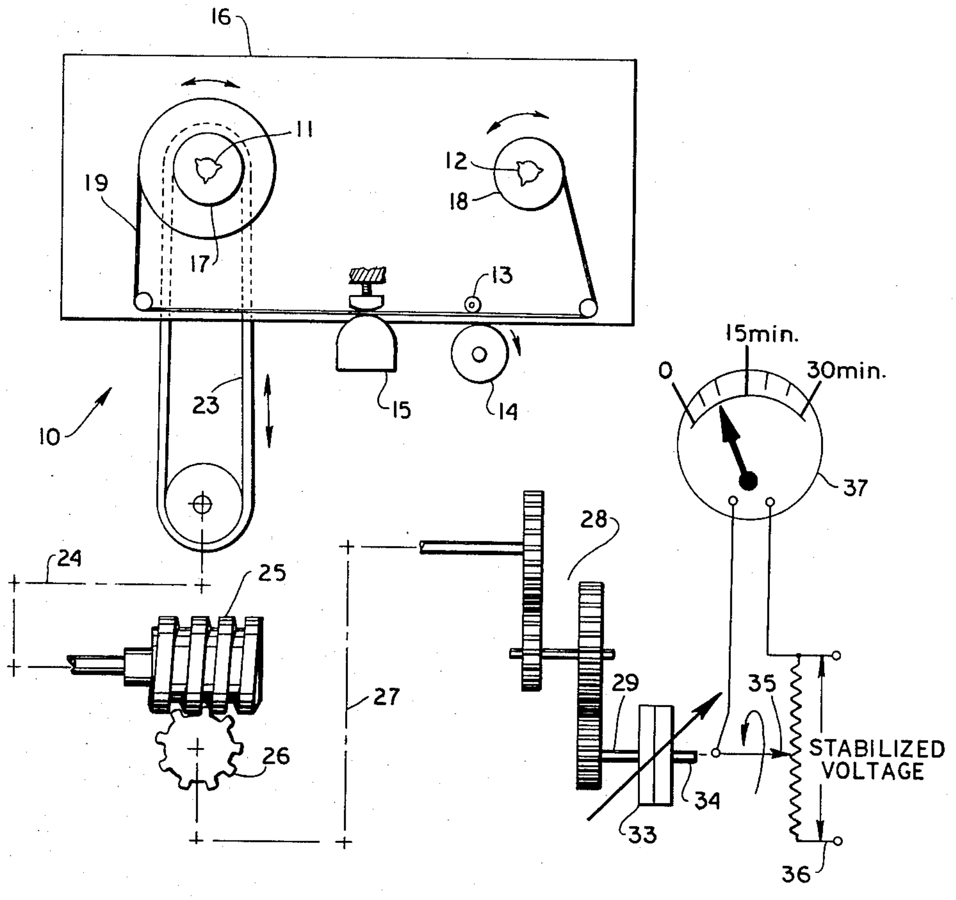
FIG. 1 shows a partially schematic diagram of recorder indexing apparatus according to an embodiment of the present invention.
Figure 2:
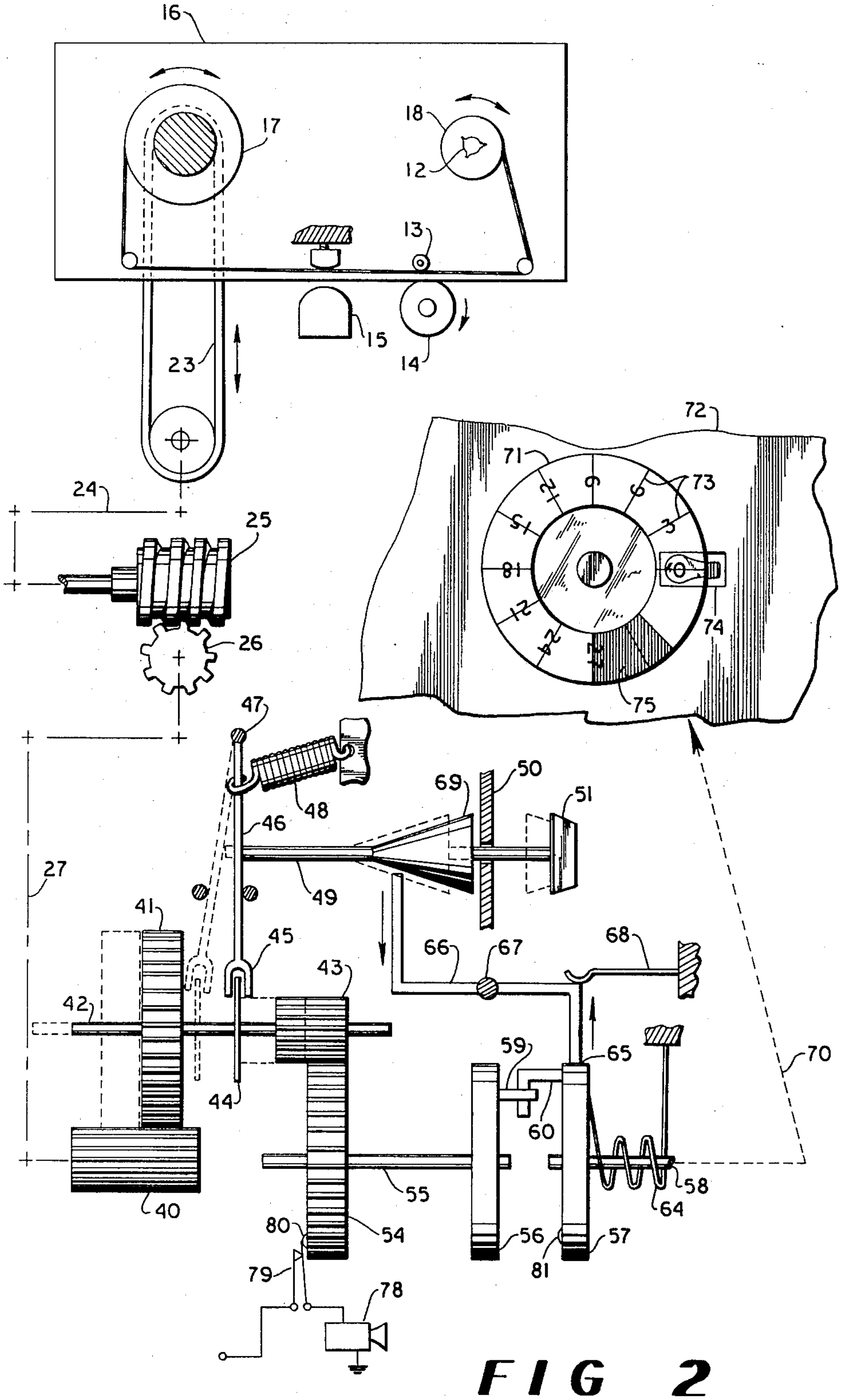
FIG. 2 shows in greater detail the indexing drive mechanism according to the disclosed embodiment of the present invention.

Stated more particularly and with reference to the disclosed embodiment as shown in FIGS. 1 and 2, there is shown generally at 10 an embodiment of a tape recorder apparatus including the present invention. Although the term "tape recorder" is used throughout, it will be understood that such apparatus is conventionally designed to be capable of both recording and playback of messages on recording tape. It will also be understood that use of the term "tape" herein to identify the recording medium is exemplary, and that the principles and practice of the present invention are as well applicable to recording apparatus which uses forms of recording media, such as belts, discs, or the like, other than tape.

The recorder 10 includes a tape supply spindle 11, a tape take-up spindle 12, a capstan 13, a pressure roller 14, and at least one transducer 15, the foregoing elements being conventional in tape recorder construction and being fragmentarily shown herein for the purpose of extablishing the environment of construction and operation of the present invention. Further by way of example, a tape cassette 16 having a tape supply reel 17 and a tape take-up reel 18 is shown disposed in the recorder, with the supply spindle 11 engaging the supply reel 17 and the take-up spindle 12 engaging the take-up reel 18. It will be understood that the tape cassette 16 may be any conventional cassette such as the popular and well-known, "C-60" cassette or the like. Moreover, it will be understood that the recorder 10 could utilize conventional reel-to-reel construction in lieu of the cassette-specialized construction. A quantity of recording tape 19 extends from the supply reel 17 past the transducer 15 and between the capstan 13 and the pressure roller 14 to be wound around the take-up reel 18.

The various drive motors, clutches, brakes, and associated control elements which are present in tape recorders to impart selective forward and reverse movement to the tape transport mechanism are well-known and need not be described herein. However, a suitable drive device such as the belt 23 is mechanically coupled to be driven by movement of the supply spindle 11, and it will be seen that the belt 23 is moved in either direction as tape is alternatively withdrawn from the supply reel 17 or is rewound onto that reel. The movement imparted to the belt 23 is further mechanically coupled through a suitable connection shown only diagrammatically at 24 to impart rotation to the worm gear 25, which in turn drives a spur gear 26 interconnected through diagrammatic linkage 27 to drive a gear train 28. Those skilled in the art will realize that the diagrammatically shown linkages 24 and 27 may consist of any conventional motion transfer devices such as belts, shafts, gearing, or the like. The gear train 28 preferably is selected to have a reduction ratio which, taken along with the remainder of the drive mechanism extending from the supply spindle 11, causes the shaft 29 to revolve not more than one complete revolution in response to the total number of revolutions imparted to the supply spindle 11 by complete unwinding of the maximum amount of tape normally present on the supply reel 17. For example, the total reduction in movement between the supply spindle 11 and the shaft 29 may advantageously be selected so that the shaft 29 rotates 320° in response to the complete unwinding of the tape normally supplied on a C-60 cassette. Since this quantity of tape corresponds approximately to 32 minutes of recording time, the foregoing reduction ratio causes the shaft 29 to rotate approximately 10° for each minute of available tape recording time.

The output shaft 29 is coupled to a one-way mechanism 33 having an output shaft 34 which is mechanically coupled, in the embodiment depicted in FIG. 1, to the slider 35 of a potentiometer 36. The ends of the potentiometer 36 are connected across a voltage source which is preferably stabilized, and an indicating meter 57 is connected to one end of the potentiometer and to the slider 35. The indicator 37 and the potentiometer 36 are preferably selected so that movement of the potentiometer slider 35 along the full extent of the potentiometer in response to the complete range of rotation of the shaft 34 causes corresponding full-scale movement of the indicator 37, which may conveniently be calibrated in minutes of utilized recording time. The indicator 37 may, if desired, be calibrated to show full-scale indication when a slight amount of unrecorded tape remains on the supply reel.

The structural details and operation of a one-way mechanism 33 according to the herein-disclosed embodiment are shown in FIG. 2 where the gearing used in conjunction with the one-way mechanism may advantageously be partially combined with the gear train shown at 28 in FIG. 1. The linkage 27 is connected to drive a gear 40 meshed with a second gear 41 affixed to cause rotation of the shaft 42. Also affixed to the shaft 42 for rotation therewith are a third gear 43 and a disc 44. The shaft 42 is appropriately mounted for conventional axial rotation and is additionally mounted to be translated a distance along the axis of rotation. The foregoing translation is accomplished by engagement of the fork 45, which surrounds a peripheral portion of the disc 44. The shaft 42, the gears 41 and 43, and the disc 44 are shown in FIG. 2 in the engaged or right-hand position by solid lines, and in the disengaged or left-hand condition by broken lines. The fork 45 is disposed at one end of a rod 46 pivotally mounted at 47 for rotation, and the rod 46 is normally urged by the tension spring 48 to keep the shaft 42 and its associated gearing in the right-hand or engaged position. The arm 46 is selectively moved from its normal or right-hand position to the left-hand position shown in broken line, through a push rod 49 connected through the panel 50 to a control member 51.

The third gear 43 normally meshes with a fourth gear 54 connected to rotate a shaft 55 on which is connected a wheel 56. The wheel 56 confronts a second wheel 57 which is mounted to drive a second shaft 58, this second shaft 58 being coaxial with but unconnected to the first shaft 55. A drive member 59 is provided to extend outwardly from the confronting face of the drive wheel 56, and a driven member 60 is provided extending outwardly from the confronting face of the driven wheel 57. It can be seen from FIG. 2 that rotation of the drive wheel 56 causes the drive member 59 to circumscribe a circular path which is occupied by a portion of the driven member 60, so that the drive member 59 can move into contact with the driven member 60. When this happens, continuing rotation of the drive wheel 56 imparts rotation to the driven wheel 57 and thus to the output shaft 58.

The output shaft 58 and the driven wheel 57 are urged by a resilient device such as the torsion spring 64 in a retrograde direction tending to cause the driven member 60 to remain in contact with the drive member 59. However, a braking force is normally applied to the driven wheel 57 which prevents this retrograde movement from occuring at the urging off the spring 64. This braking force may be applied through contact of the lever end 65 with the periphery of the driven wheel 57, the lever end being biased by the spring 68 into the normal or braking contact position. The lever end 65 is provided on a lever 66 pivoted at 67 for rotational movement at the control of a cam member 69 affixed to the push rod 49 for movement therewith.

In the embodiment of the present invention as depicted in FIG. 2, rotation of the output shaft 58 is mechanically connected as at 70 to an indicator dial 71 which may be mounted for rotation on a suitable panel or other portion 72 of the recorder. The dial 71 may comprise a disc having suitable time or other indicia 73 contained along a portion of the disc, and a source of illumination 74 may be provided behind the dial at a location corresponding to the index or reference point for reading the dial. The end portion 75 of the indicia may be colored red or otherwise may distinctively be marked to indicate that the end of the available recording tape has been approached.

A similar warning of impending tape-end may be provided by an audible or visual warning device such as the signal 78 which is operated upon closure of the switch 79 by the cam 80 mounted for rotation with the fourth gear 54. It will be understood that the location of the cam 80 on the fourth gear 54 is preferably chosen so that the switch 79 is closed at the time that the end indicia 75 is positioned over the dial index, thereby providing the dictator with an audible or visual signal that he is approaching the end of available tape. The switch 79 can alternatively be operated by being placed in conjunction with the cam 81 positioned on the driven wheel 57, if desired.

In considering the operation of the working embodiment described thus far, it will be seen that rotation of the supply spindle 11 in either direction causes corresponding rotation of the shaft 42 and the gears mounted thereon. Assuming that tape is being withdrawn from the supply reel 17, the shaft 42 rotates in a direction to cause the third gear 43 to drive the fourth gear 54 and the shaft 55 in a direction to place the drive member 59 into contact with the driven member 60, thereby causing rotation of the driven wheel 57, the output shaft 58, and the dial 71. Although the braking force of the lever end 65 is applied to the driven wheel 57 at this time, this force is chosen relative to the driving input from the drive member 59 to permit frictional slippage of the driven wheel 57 with respect to the lever end 65.

If the dictator reverse movement of the tape transport mechanism after dictating a passage of tape, the driving wheel 56 undergoes a corresponding reversal of motion through the linkage connection with the supply spindle 11. However, the driven wheel 57 is prevented by the braking engagement of the lever end 65 from corresponding movement in the reverse or retrograde direction, and it can be seen that the driven wheel 57 and the dial 71 remains at the maximum position as previously moved by the drive wheel 56. The driven wheel 57 and the dial 71 remains thus positioned no matter how much tape is rewound onto the supply reel 17, and no further movement of the dial 71 occurs until such time as the tape is again unwound from the supply reel to the extent previously unwound, whereat the drive wheel 56 moves the drive member 59 back into contact with the driven member 60. The apparatus including the drive wheel 56 and the driven wheel 57 thus functions as a lost motion linkage.

After the dictator has completed his desired recording on a particular cassette 16, he can move the control member 51 to the left-hand position shown in broken lines. This movement concurrently causes the third gear 53 to be moved out of meshing engagement with the fourth gear 54, and causes the lever end 65 to be moved out of braking engagement with the driven wheel 57. The driven wheel 57 is now permitted to be rotated in the retrograde direction under the influence of the spring 64, and the driven member 60 forces the drive member 59, the drive wheel 56, and the fourth gear 54 also to move in the retrograde direction. In this way, the dial 71 and its associated driving mechanism is reset to a zero-time location, and the recorder indexing apparatus is thereby reset to repeat the index function for the next cassette or other tape supply.

Figure 3:
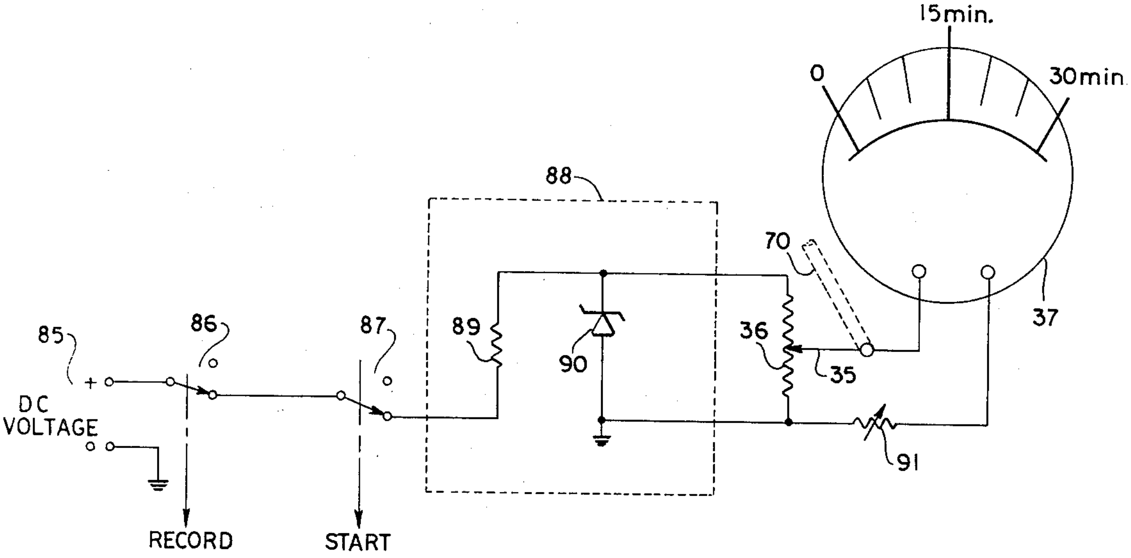
FIG. 3 shows a schematic diagram of an alternative indicator for use with the present invention.

Although the foregoing operational description of FIG. 2 refers to movement of the indicator dial 71, it will be understood that the mechanical connection 70 alternatively can be made to a potentiometer slider 35 as in FIG. 1. A more specific showing of an electrical indicator useful with the present invention is shown in FIG. 3, wherein the slider 35 of the potentiometer 6 is connected for movement in response to rotation of the mechanical connection 70. A suitable source of DC voltage is supplied at the input terminals 85 to a pair of switches 86 and 87 electrically connected in series. The switches 86 and 87 may be actuated separately or in conjunction with other operational controls of the recorder, such as "record" mode selection and a "start" switch to commence recorder operation. The voltage passes from the switch 87 through a voltage regulation network 88, which may consist of a resistance 89 and a Zener diode 90 connected to provide a substantially stabilized voltage across the potentiometer 36. A variable resistance 91 may be provided in series with the electrical connection from the potentiometer 36 to the indicator 37, to facilitate calibration of the indicator.

Although the disclosed embodiment of the present invention uses a mechanical drive train to accomplish the desired one-way transfer of motion from the supply spindle 11 to the tape indicator, it will be appreciated that other techniques for accomplishing such one-way control may be substituted in the present invention. For example, rotation of the supply spindle 11 could be connected to generate a series of electrical pulses which could be applied to appropriate discrimination circuitry to separate and permit passage only of the pulses corresponding to the desired direction, ie., tape unwinding, of supply spindle rotation. A suitable pulse counting device connected to count the pulses passed by the discriminator will provide the desired cumulative indication of tape forward motion.

Moreover, it should be understood that while the foregoing relates to a specific embodiment of the present invention, numerous alterations or modifications may be made therein without departing from the spirit and the scope of the invention as defined in the following claims.

What is claimed is:

1. In a web moving apparatus including a web movement member which is selectively operative to move a web in either of two directions, apparatus for measuring the net amount of web movement in a first direction, comprising:

first means operatively connected to said web movement member to provide a first output of an amount corresponding to movement of the web;

second means connected to be responsive only to the amount of output of said first means corresponding to initial movement of said web in the first direction and to be nonresponsive to first means output corresponding to movement in the first direction of web which has been previously moved in the first direction, said second means thereby operative to provide a second output corresponding only to an output of said first means caused by initial movement of the web movement member in a first direction; and indicator means connected to be responsive to said second output to provide an indication which is a function of initial movement of the web movement member in said first direction only.

2. Apparatus as in claim 1, wherein:

said second means includes a lost motion connection operative to provide said second output only in response to initial movement of said web movement member in said first direction and to provide no output in response to subsequent movement of said web movement member in said first direction to an extent previously moved in said first direction.

3. Apparatus as in claim 2, further comprising:

reset means selectively operatively associated with said second means to cause said second output to be set to a predetermined initial indication.

4. Apparatus as in claim 1, wherein:

said first means comprises a drive member connected for movement in response to movement of the web movement member; and said second means comprises a driven member which is selectively engaged by said drive member to be driven in a first direction by movement of said driving member in said first direction and not to be driven in a second direction by movement of said driving member in said second direction.

5. Apparatus as in claim 4, further comprising:

means operatively engaging said driven member and resiliently urging said driven member in said second direction;

brake means normally engaging said driven member to prevent movement of said driven member in said second direction in response to said urging means; and said brake means being selectively releasable to permit said driven member to be moved in said second direction by said urging means.

6. Apparatus as in claim 5, further comprising:

a clutch disposed in the operative connection between the web movement member and said drive member;

said clutch being selectively disengageable to disconnect said operative connection.

7. Apparatus as in claim 6, further comprising:

actuating means operatively connected with said clutch and said brake means to cause selective concurrent disengagement of said clutch and releasing of said brake means, so that said driven member can be moved in said second direction by said urging means independently of movement of the web movement member.

8. Apparatus as in claim 7, wherein:

said clutch includes a first member connected to be driven for rotation by the web movement member and a second member connected to rotate said drive member;

said first member and second member being mounted for selective movement to an engaged position, wherein rotation of said first member is imparted to said second member, and to a disengaged position, where rotation of said first member is not imparted to said second member.

9. Apparatus as in claim 8, wherein:

one of said first and second members is mounted for rotation on a shaft which is selectively translatable to place said first and second members in said engaged and disengaged positions; and said actuating means is selectively operative to translationally move said shaft for controlling said engagement of said first and second members.

10. Tape recording apparatus, comprising:

a tape movement member operative for movement in either of two directions to accomplish corresponding movement of the recording tape in either a forward or a reverse direction;

motion transmitting means operatively connected to be driven in either of two directions by movement of said tape movement member;

one-way drive means having an input member connected for movement by said motion transmitting means and having an output member operative to move only in response to movement of said input member in a predetermined direction corresponding to forward movement of tape;

means operatively connected to said output member to urge the output member in a direction opposite to said predetermined direction, brake means selectively engaging said output member to prevent said opposite direction movement of the output member, said brake means being selectively releasable to permit said opposite direction movement; and indicator means operative in response to movement of said output member to provide an indication of the amount of movement of said tape movement member in such predetermined direction.

11. Apparatus as in claim 10, wherein:

said input member includes a driving member which moves in a predetermined path as said input member is moved by said motion transmitting means;

said output member includes a driven member disposed in said predetermined path to be drivingly engaged by said driving member moving in said predetermined direction along said predetermined path; and said driving member being free to move out of said driving engagement with said driven member when moved in a direction opposite said predetermined direction.

12. Apparatus as in claim 11, wherein:

said predetermined path has a certain extent, and said motion transmitting means is operative to move said input member a distance not exceeding the extent of said predetermined path in response to movement of said tape movement member which moves in a forward direction all of the tape in a tape supply available for recording.

13. Apparatus as in claim 11, wherein:

said motion transmitting means includes selectively disengagable clutch means to enable said output member and said input member to be moved in said opposite direction by said force applying means.

14. Apparatus as in claim 13, further comprising:

actuating means operatively connected with said clutch means and with said brake means;

said actuating means being selectively operable to concurrently disengage said clutch means and release said brake means.

* * * * *